Jan. 6, 1931.  J. E. ANDERSON  1,788,268
EJECTOR FOR TAPER SHANK CUTTING TOOLS
Filed Jan. 28, 1928
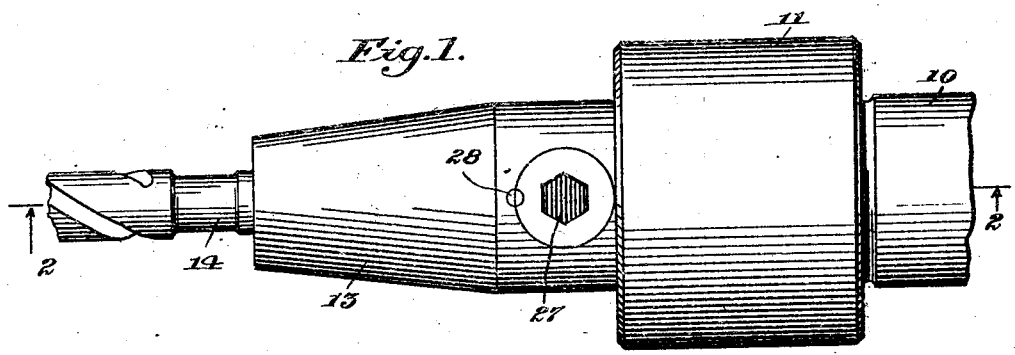
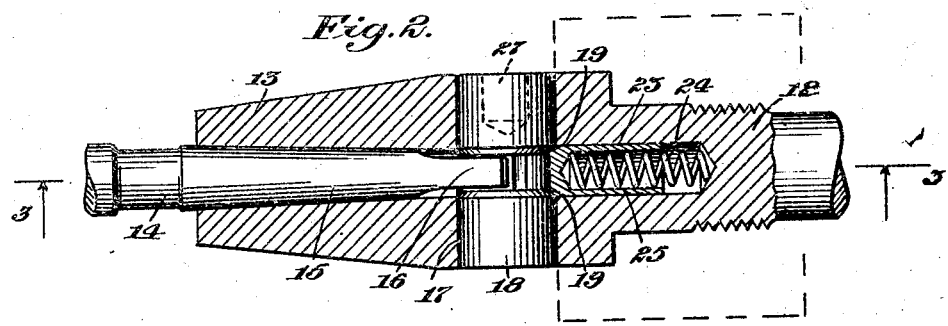
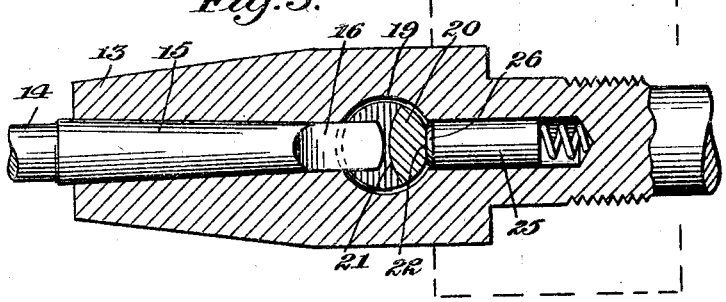
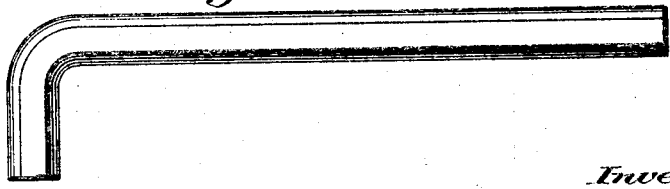
Inventor:
John Elmer Anderson, Patented Jan. 6, 1931

1,788,268

UNITED STATES PATENT OFFICE

JOHN ELMER ANDERSON, OF KEENE, NEW HAMPSHIRE, ASSIGNOR TO KINGSBURY MACHINE TOOL CORPORATION, OF KEENE, NEW HAMPSHIRE, A CORPORATION OF NEW HAMPSHIRE

EJECTOR FOR TAPER-SHANK CUTTING TOOLS

Application filed January 28, 1928. Serial No. 250,253.

This invention relates to an ejector for use on a chuck for taper shank cutting tools.

One of the objects of this invention is the provision of a cam ejector in which the cam may be held in the position for the insertion of a taper shank cutting tool.

Another object of this invention is to provide a structure whereby such holding means is likewise employed to prevent a movement of the cam supporting block into and out of position in the axial direction of the cam.

A further object of the invention is to provide a cam ejector which acts directly on the end of the taper shank cutting tool inserted in the chuck, so that by a rocking or oscillation of the cam, alternate stresses may be applied on the taper shank to cause a slight rocking movement whereby to loosen it in the chuck sleeve, in addition to imparting an axial movement to the taper shank with respect to the sleeve.

A further feature of this invention is the construction and arrangement of the parts so that the cam supporting member is prevented from withdrawal from the chuck by a taper shank cutting tool when in the chuck sleeve.

On the accompanying drawings is illustrated one form of employment of the invention by way of example, in which:

Figure 1 is an elevation of a chuck having a cam ejector according to the present invention.

Fig. 2 is a sectional view substantially on line 2—2 of Fig. 1, with parts eliminated for greater clearance.

Fig. 3 is a diametral sectional view on line 3—3 of Fig. 2, with the same parts eliminated.

Fig. 4 is a view of a key for rocking or rotating the ejector body.

In these drawings, the quill bushing 10 of a drill or other machine tool provided with a coupling sleeve 11, receives and firmly holds the threaded end 12 of the drill spindle which has a tool receiving sleeve 13 at its other end in which a cutting tool 14 having a tapered shank 15 may be received. The taper shank 15 of the tool terminates in a flattened tang 16 having a rounded end surface, as shown in Fig. 3.

A bore hole 17 passes through the chuck body opposite the end of the tang 16 so that the tang projects well into the bore hole.

An ejector body 18, illustrated as being cylindrical at its ends, fits within this bore hole 17 and is adapted to rotate freely therein. Intermediate its ends the ejector body is cut away to form the conical surfaces 19, between which the body is further cut away to leave an eccentric connecting bridge 20 having a curved or double cam surface 21 opposite the tang 16, and a flattened surface 22 at the other side.

The tapered hole in the sleeve 13 is continued beyond the bore hole 17 as a cylindrical hole 23 which receives a coil spring 24 carried partly in the cupped plunger 25 having a beveled end 26 with its angle adapted to fit it to the conical walls 19 of the ejector body 18, while its flat end may rest upon the flattened part 22 of the bridge 20.

At one end of the ejector body 18 is formed a polygonal cavity 27 to receive the end of a corresponding key whereby to rotate the ejector body. It is preferred to stamp a designating mark 28 such as an "O" on both the end surfaces of the ejector body 18 and the adjacent surface of the chuck; the two halves of this mark being in alinement when the bridge 20 is farthest removed from the tang 16.

The method of operation of this ejector is as follows: When a cutting tool 14 is seated by its taper shank in the sleeve 13, its tang 16 projects into the cut away portion of the ejector body 18. The ejector body 18 is held in the position of Fig. 3 by the engagement of the plunger cup 25 by its flat end on the flat part 22 of the bridge 20. When it is desired to remove the cutting tool 14 from the chuck 13, a key is inserted in the cavity 27 of the ejector body, and this ejector body is rotated about its axis, whereby the surface 22 moves away from beneath the cupped plunger 25 in rotation until its surface 22 comes against the upper end of the tang 16, thus causing a stress upon the taper shank 15 in the axial direction, and also forcing the tang and taper shank toward one wall of the taper hole in the chuck sleeve 13, tending to release it if stuck. If this first turning movement of the ejector body 18 does not accomplish the removal of the tool 14, the key is turned in the opposite direction so that the body 18 rotates until another part of the double cam surface 21 strikes against the other side of the end of the tang 16, and again an axial stress is placed upon the taper shank, but with a "working" of the tang itself toward the diametrally opposite wall of the taper hole in the chuck sleeve 13. This operation can be continued until the taper shank is worked loose. It will be noted that the cam surface 21 does not produce a simple axial movement or strain on the taper shank of the tool, but a combined axial and rocking movement.

When the ejector body 18 is at any other position than that shown in Fig. 3, it is still held against axial movement out of the chuck body by the engagement of the cupped plunger 25 against its conical surfaces 19: but if it be desired to remove it, a direct pressure upon either end will force the cup plunger away from and out of the groove sufficiently so that the ejector body 18 may be disengaged. It will be noted, however, that as long as a tool is seated within the chuck sleeve 13, the tang 16 projects into the cut away portion of the ejector body 18 and prevents its removal: so that the parts remain in operative condition so long as their operation may be required. Further, if the tool tends to rotate within the chuck, the sides of the flattened tang immediately come in contact with the walls of the cut away portion so that a drive is established through the ejector body to the tank of the tool.

It is obvious that the invention is not limited to the form of execution shown, but may be embodied in many ways within the scope of the appended claims.

What I claim is:

1. In a chuck for taper shank cutting tools, a body having an axial cavity to receive the taper shank of a cutting tool and a bore hole intersecting this inner end of said cavity, an ejector body of circular section substantially filling and rotatable about its axis in said bore hole and being cut away substantially centrally of its length opposite the said axial cavity to form a cam surface eccentric to said axis within the ejector body, the cavity and bore hole being so located and arranged that the end of the shank of the cutting tool enters the ejector body at the cut away portion thereof and retains said body in said bore hole while the chuck is in use, and means to rock said ejector body.

2. In a chuck for taper shank cutting tools, a body having an axial cavity to receive the taper shank of a cutting tool and a bore hole intersecting the inner end of said cavity, an ejector body rotatable in said bore hole and having an annular groove therein with conical walls, a retaining plunger having a beveled end guided in said chuck body and adapted to enter said groove to retain the ejector body in said chuck body during the relative rotation of the ejector body; and a spring acting upon said retaining plunger to hold the same in position.

3. In a chuck for taper shank cutting tools, a chuck body having an axial cavity to receive the taper shank of a cutting tool and a bore hole intersecting the inner end of said cavity, an ejector body rotatable in said bore hole and having a cam to cooperate with the end of the shank to eject the tool from the cavity, said ejector body also having a flattened portion, a retaining plunger guided in said chuck body and adapted to engage said flattened portion to hold said ejector body against rotation when in inoperative position, a spring to force said plunger against said ejector body, and means to rock said ejector body.

4. In a chuck for taper shank cutting tools, a chuck body having an axial cavity to receive the taper shank of a cutting tool and a bore hole intersecting the inner end of said cavity, an ejector body rotatable in said bore hole and cut away to provide a double surface cam within said ejector body, the end of the shank of the cutting tool entering the ejector body at the cut away portion thereof, whereby the ejector body may be rocked in both directions to exert an outward an alternate lateral thrust on said shank to free and eject the tool from the cavity, and means to rock said ejecter body.

5. In a chuck for taper shank cutting tools, a body having an axial cavity to receive a taper shank of a cutting tool and a bore hole intersecting the inner end of the cavity, a substantially cylindrical ejector body rotatable in said bore hole and being cut away chordally so that the tang of the tool may enter the body, and means on the body to exert lateral and axial stresses on the tool to free and eject the tool from the cavity.

6. In a chuck for taper shank cutting tools, a body having an axial cavity to receive the taper shank of a cutting tool and a bore hole intersecting the inner end of said cavity, an ejector body of circular section substantially filling and rotatable in said bore hole and having an annular groove thereon opposite said axial cavity, said cavity being extended beyond said ejector body, a cup-like retaining plunger guided in said extended cavity and adapted to enter said groove to retain the ejector body in said chuck body during the relative rotation of said ejector body, and a spring in said extended cavity and in said cup-like plunger and acting upon the internal walls of the same to hold the plunger in said groove.

7. A chuck as in claim 6, in which the bottom of the annular groove has a depression, and the plunger is seated in said depression when the ejector body is in position for the reception of a tool, said depression and plunger cooperating under the action of said spring to hold the ejector body in such position for reception.

In testimony whereof, I affix my signature.

JOHN ELMER ANDERSON.